Figure 1:
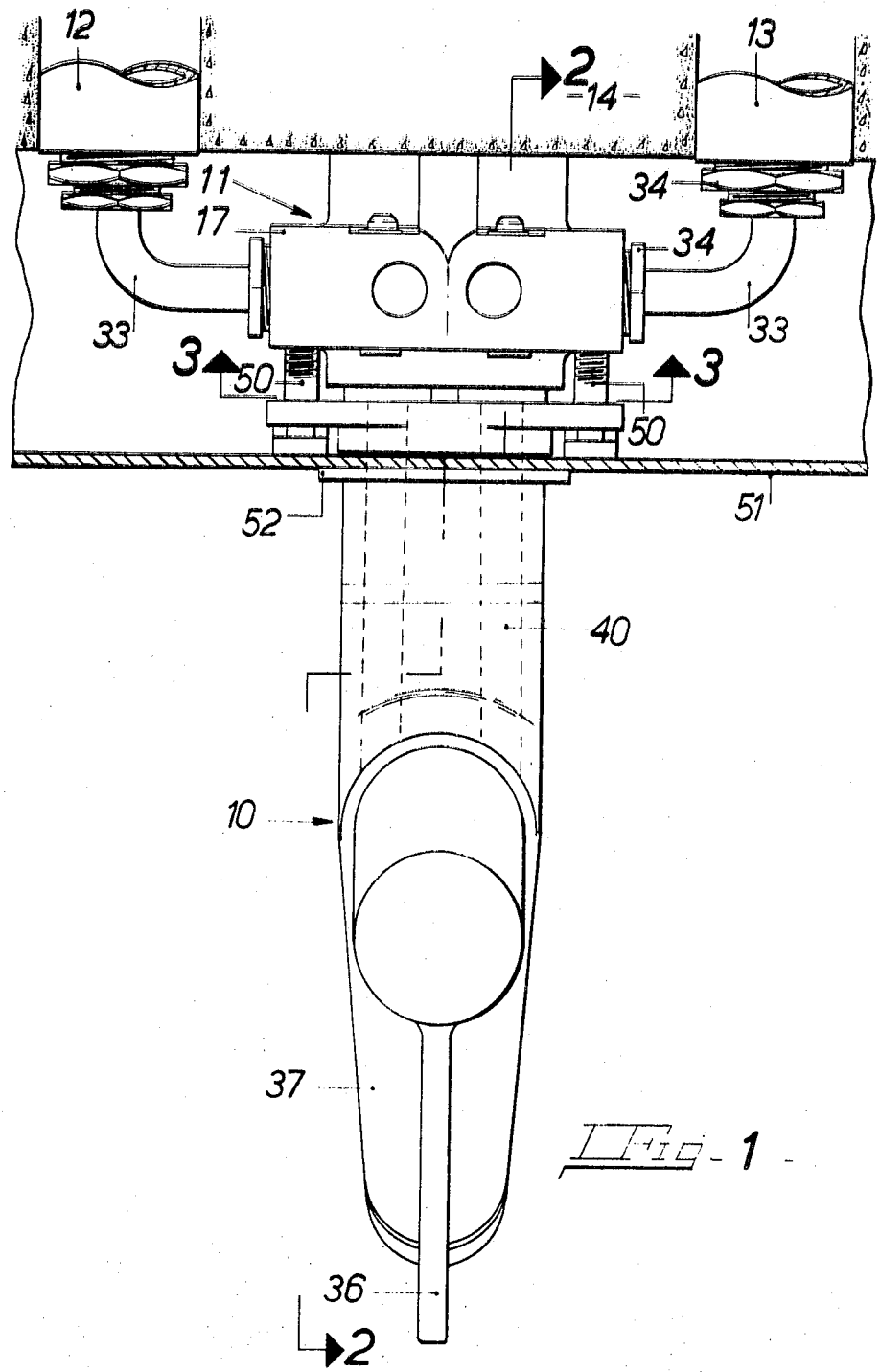

United States Patent
Arbon

[15] 3,659,626
[45] May 2, 1972

[54] FLUID CONTROL ASSEMBLIES

[72] Inventor: Dennis Charles Arbon, Cheltenham, England

[73] Assignee: Walker, Crosweller & Company Limited, Cheltenham, England

[22] Filed: July 13, 1970

[21] Appl. No.: 54,341

[52] U.S. Cl. ............................137/329.1, 137/606, 251/149.6
[51] Int. Cl. ..........................................................F16k 19/00
[58] Field of Search .............137/329.1, 329.2, 329.3, 329.4, 137/798, 801; 251/149.6, 149.7

[56] References Cited

UNITED STATES PATENTS

| | | | |
|---|---|---|---|
| 739,793 | 9/1903 | Shourek | 251/149.6 X |
| 1,226,175 | 5/1917 | Bibleheiser, Jr. | 137/329.1 |
| 2,124,937 | 7/1938 | Whittle | 251/149.6 X |
| 2,630,338 | 3/1953 | Snyder | 251/149.7 |
| 1,485,544 | 3/1924 | Yeiser | 137/329.1 |
| 1,948,971 | 2/1934 | Meyer | 137/798 X |
| 3,357,599 | 12/1967 | Douglas et al. | 251/149.7 X |

FOREIGN PATENTS OR APPLICATIONS

| | | | |
|---|---|---|---|
| 13,630 | 1895 | Great Britain | 251/149.7 |
| 506,044 | 5/1939 | Great Britain | 251/149.6 |
| 672,947 | 3/1939 | Germany | 251/149.6 |

*Primary Examiner*—Robert G. Nilson
*Attorney*—Kemon, Palmer & Estabrook

[57] ABSTRACT

A fluid flow control assembly comprising a tap and a mounting block for connection to the fluid supply. The mounting block includes a valve means which is closed to prevent fluid flow from the block when the tap is removed from, or not mounted on the block, and which is opened when the tap is connected to the block.

7 Claims, 4 Drawing Figures

Patented May 2, 1972

3,659,626

2 Sheets-Sheet 1

INVENTOR
Dennis Charles Arbon
attys.
Kenon, Palmer & Estabrook

Patented May 2, 1972
3,659,626
2 Sheets-Sheet 2
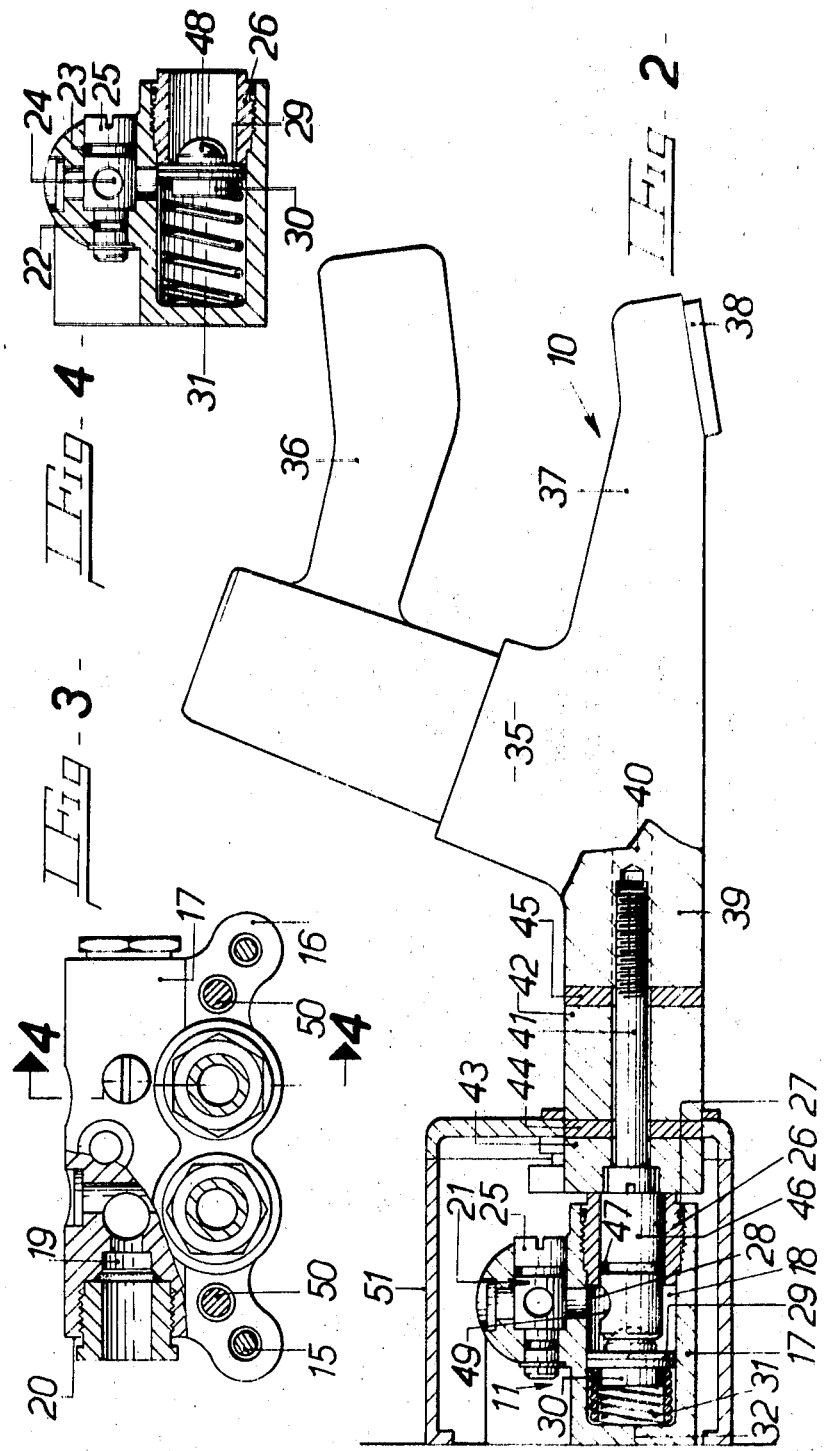
INVENTOR
Dennis Charles Arbour
attys.
Kenon Palmer + Estabrook

FLUID CONTROL ASSEMBLIES

This invention is concerned with improvements in or relating to fluid flow control assemblies, such as a hot and cold water mixing tap adapted for mounting on a wall, partition or analogous support.

The principal object of this invention is to provide a fluid flow control assembly which can be connected to the fluid source and, without shutting off the supply of fluid from the source, the assembly can be separated to remove, or subsequently replace the tap such as when the tap requires servicing, or decorating effected.

Another object of this invention is to provide a fluid flow control assembly embodying means by which the tap can be connected after the supply pipes have been connected to the respective sources, all additional fittings have been installed and decorations completed.

A further object of this invention is to provide a fluid flow control assembly embodying means, which in addition to mounting the assembly upon a support, is adapted to connect the assembly to pre-installed fluid supply pipes which may be spaced apart by different distances.

According to this invention we provide a fluid flow control assembly comprising a mounting block adapted for connection to a fluid supply and a tap for detachable connection to the mounting block, the mounting block having an inlet passage and an open-ended chamber in communication therewith, and the tap having a bore adapted to communicate with the open end of the chamber when the tap is connected to the mounting block, and valve means in the chamber for controlling the flow of fluid from the inlet passage through the chamber into the tap bore, said valve means being adapted to close when the tap is detached from the mounting block to prevent flow of fluid out of the chamber, and to be opened when the tap is connected to the mounting block.

With the invented assembly, once the mounting block has been installed, the tap may be connected to the mounting block, and subsequently disconnected without shutting off the fluid source.

Preferably, the tap is provided with a hollow spigot aligned with the tap bore and adapted for sliding insertion in a fluid-tight manner into the open end of the chamber to connect the chamber and the tap bore, and the valve means is adapted to be opened by the spigot when it is inserted into the chamber.

With this preferred construction the mounting block may be regarded as a socket into which the tap may be plugged with an automatic connection to the fluid supply being effected, and, conversely, on unplugging the tap, the connection to the fluid supply is automatically closed.

It is also preferred that the valve means is biased into the closed position by spring means. A conventional form of clack valve is of this type, but it is envisaged that the valve means could be arranged for closure by fluid pressure derived from the fluid source.

It is also intended in accordance with this invention that the mounting block may provide one or more inlet passages each with a corresponding chamber, and a single bore tap may be connected to each chamber, or a tap where there is more than one inlet passage, having a corresponding number of bores may be attached to the mounting block to connect the bores to the corresponding chambers.

This invention is also deemed to include the mounting block adapted for connection to the tap, and the tap adapted for connection to the mounting block.

Other aspects and advantages of this invention will be apparent to those familiar with this subject with reference to the description of an embodiment of this invention which will now be described with reference to the accompanying drawings wherein:

FIG. 1 is a part section plan view of the fluid 1; control assembly mounted on a wall;
FIG. 2 is a section on line 2—2 of FIG. 1
FIG. 3 is a section on line 3—3 of FIG. 1; and
FIG. 4 is a section on line 4—4 of FIG. 3 without the mixing tap.

As is shown in the drawings, the fluid flow control assembly comprises a hot and cold water mixing tap generally depicted at 10 and a mounting block 11 connected to hot and cold water supply pipes 12, 13 embedded in the wall 14 and of which the outlet ends are open to the wall surface and may be pitched apart by any one of a range of different distances. The mounting block 11 is adapted to be secured to the wall 14 by wood screws 15 or analogous expedients by means of pierced external lugs 16 extending from the mounting block body 17.

The mounting block body 17 is formed, firstly, with two parallel, cylindrical chambers 18 which open to the block face remote from, and parallel to the wall surface, and secondly, with two inlet passages 19 extending from opposed sides 20 of the block, each inlet passage 19 communicating respectively to a chamber 18.

The body 17 is secured upon the wall surface so that the centers of the outlet ends of the supply pipes 12, 13 and of the outer ends of the inlet passages 19 are located in a common plane.

In the body 17 the inner ends of each of the two inlet passages 19 extend above the corresponding chamber 18, and in each such end of adjustable restrictor valve 21 is mounted. Each restrictor valve 21 is mounted in a stepped bore in the body 17 extending transverse to the inlet passage 19 and it is sealed therein by two O-rings 22, 23. The restrictor valve 21 has a port 24 through which flow is directed into the associated chamber 18, and the rate of such flow is adjustable by rotating the slotted head 25 of the valve 21 which is accessible from the outside of the body 17 when it is secured to the wall 14.

In the open end of each chamber 18 a cylindrical sleeve 26 is received in threaded engagement with the body 17, and a seal 27 is located between the body 17 and an annular lip adjacent to the outer end of the sleeve 26. The inner end face of the sleeve 26 provides an annular seating 28 (see FIG. 4) for a resilient washer 29 mounted on a circular clack valve 30 which is biased towards the seating 28 by a coil spring 31 accommodated between the valve and the internal end wall 32 of the chamber 18 so that the clack valve 30 may be maintained in the closed position depicted in FIG. 4.

After securing the mounting block 11 upon the wall 14, each of the inlet passages 19 is connected to the adjacent supply pipe 12 or 13 by an elbow-shaped pipe 33 of copper or other appropriate material. The lengths of the arms of the elbow-shaped pipe 33, which are conventionally formed longer than required, are reduced appropriately by cutting off the free ends of the arms on site to such length that the free ends of each pipe 33 may be coupled respectively by pipe joints 34 to the discharge end and outer end of the corresponding supply pipe 12 or 13 and inlet passage 19.

Accordingly, the mounting block 11 is connected to sources of supply of hot and cold water which can flow into the inlet passages 19 and into the corresponding chambers 18, but the clack valves 30 are in the closed position depicted in FIG. 4 so that neither the hot or cold water can flow out through the open ends of the chambers 18.

Now the mounting block 11 is so connected to the water supply, the mounting of the mixing tap 10 to complete the assembly may be carried out.

The mixing tap 10 comprises a body 35 in which the control and mixing valves (not shown) are housed, a control handle 36 and a spout 37 with a discharge outlet 38.

The base portion 39 of the tap 10 includes two parallel axial bores 40 (depicted in dashed lines in FIG. 1) for conducting fluid to a mixing chamber and valve means (both not shown) in the tap 10. Attached to the base portion 39 by means of bolts 41 are an extension shank 42 and an end fitting 43, each separated by packing washers 44, 45. Each of the packing washers 44, 45 have corresponding axial bores as well as spigots on both faces which carry 'O' seals for making a watertight seal respectively within the bores of the extension shank 42, tap body portion 39 and end fitting 43. In accordance with the required spacing of the discharge outlet 38 from the wall 14, the extension shank 42 may be omitted, and the end fitting 43 attached directly to the base portion 39 of the tap 10, or formed integral therewith.

As can be seen from FIG. 2, the end fitting 43 includes a pair of projecting spigots 46 which have axial bores correspondingly aligned with the bores of the end fitting 43, extension shank 42 and the tap base portion 39. Both of the spigots 46 are of an axial length greater than the axial length of the sleeves 26 in the chambers 18, and they are of a diameter such as to be a sliding fit in the sleeves 26 with the sealing of each spigot 46 in a sleeve 26 being effected by an O-ring 47 located in a peripheral groove provided approximately halfway along the axial length of the spigot 46.

The open free end of each spigot 46 is adapted to seat on the head 48 of the clack valve 30, and the wall of the spigot is formed with a port 49 through which fluid can flow from the chamber 18 through the various bores and thus to the tap control and mixing valve.

As will now be appreciated from the foregoing description, the pair of spigots 46 are arranged to actuate the clack valves 30 when the tap 10 is connected to the mounting block 11 by inserting the spigots 46 in their corresponding bores. The tap 10 is secured to the mounting block 11 by means of bolts 50. The mounting block 11 is enclosed in a trim cover 51 which may be attached to the wall 14 in any convenient manner, or retained by a bezel 52.

Accordingly, when the tap is so connected to the mounting block the fluid supply is simultaneously opened into the tap by the opening of the clack valves. Conversely, if it should be desired to remove the tap, when the spigots are withdrawn from the sleeves, the clack valves are closed by the coil springs and no water can escape from the socket body.

The tap can be of any known and suitable construction as long as the tap body is provided with a spigot for operating each valve means of the mounting block which controls the flow of fluid into the corresponding bore of the tap. For instance, a suitable tap for controlling the flow of, and mixing, hot and cold water for use in the invented assembly is described In the Complete Specification of our British Pat. No. 851,115.

However, it will be appreciated that the mounting block may be provided with only one inlet passage for connection to a particular fluid supply pipe and the tap part may be of conventional form with only one bore. Alternatively, a multiple tap arrangement may be provided by constructing the mounting block with more than one inlet passage, each with respective chambers and valve means adapted to be actuated independently by separate taps.

The flow restrictor valve or valves need not be located in the inlet passage of the mounting block, but could be incorporated in the tap. However, when a restrictor valve is in the mounting block, an initial setting of the flow rate can be achieved which is suitable for any tap to be fitted to the mounting block.

If desired, instead of securing the mounting block upon the wall surface, it may be secured and accommodated within, a recess formed in the wall. In such a case the configuration of the trim cover will be different, or omitted and merely a flanged bezel provided if the wall is rendered flush to the socket body once the supply pipes have been connected thereto. Similarly, when the tap is to be installed upon one surface of a relatively thin partition or the like, the socket body may be secured to the opposite side and extend through an aperture in the partition with the supply pipes extending also on said opposite side of the partition, and the aperture may be spanned and closed by a flange on the tap body end fitting.

I claim:

1. A fluid flow control assembly comprising a tap having a discharge outlet, manually operable means for controlling the discharge of fluid from said outlet, a mounting block for connection to a fluid supply and to which mounting block said tap is detachably connected, an inlet passage in said mounting block for receiving fluid from the supply, adjustable valve means mounted in said mounting block to control the rate of flow of fluid through said inlet passage, an open-ended chamber in said mounting block and in communication with said inlet passage, a hollow spigot on said tap slidably engaged within said open-ended chamber in a fluid tight manner providing a fluid-tight connection between said mounting block and said tap, a bore in said tap extending from said hollow spigot and leading to said discharge outlet, valve means in said open-ended chamber for controlling the flow of fluid through said open-ended chamber, spring means biasing said valve means into a closed position wherein said flow of fluid from said open-ended chamber is prevented, and said spigot engaging said valve means to overcome said spring means bias to maintain said valve means in the open position whereby when said tap is disconnected from said mounting block, the sliding withdrawal of said spigot permits said valve means to close to prevent the flow of fluid through said open-ended chamber.

2. The assembly according to claim 1 wherein said open-ended chamber comprises a substantially cylindrical bore having a closed end portion and an open end portion, said valve means and said spring means both being housed in said closed end portion, and a sleeve is removably mounted in said open end portion, said spigot being in sliding sealing engagement with the internal face of said sleeve, and the inner end face of said sleeve providing a seating for engagement with said valve means when said valve means is in said closed position.

3. The assembly according to claim 2 wherein said inlet passage extends transverse to said open-ended chamber bore and communicates therewith through an outlet port disposed at a position intermediate said closed end and open end portions, a transversely directed inlet port formed in said spigot and substantially aligned with said outlet port a head on said valve means in engagement with the inner end of said spigot, and a replaceable washer carried on said valve means adjacent said head.

4. The assembly according to claim 3 wherein said adjustable valve means comprises a flow restrictor extending across said inlet passage, and means for adjusting said flow restrictor extending to an exterior face of said mounting block.

5. The assembly according to claim 4 wherein said spigot is on a member separable from said tap and said member is detachably connected by threaded elements to said mounting block, said tap includes an extension member having a bore aligned with said tap bore and said spigot, and further threaded elements connect said first-mentioned member to said extension member and to said tap.

6. A fluid flow control assembly comprising a tap having a discharge outlet for a fluid mixture, manually operable means for regulating the mixture and controlling the discharge of the fluid mixture from said outlet, a mounting block for connection to first and second fluid supplies, means detachably connecting said tap to said mounting block, a first inlet passage in said mounting block for receiving fluid from said first supply, a second inlet passage in said mounting block for receiving fluid from said second supply, said first and second inlet passages having inlet ports on opposed sides of said mounting block, first and second open-end chambers in said mounting block extending in parallel spaced apart relationship and respectively in communication with said first and second inlet passages, first and second hollow spigots on said tap respectively slidably engaged within said first and second open-ended chambers in a fluid-tight manner to provide fluid-tight connections between said mounting block and said tap, first and second bores in said tap extending respectively from said first and second hollow spigots and leading to said means for regulating said mixture, first valve means in said first open-ended chamber, second valve means in said second open-ended chamber, said first and second valve means respectively controlling the flow of fluid through said first and second open-ended chambers, first and second spring means respectively biasing said first and second valve means in the same direction into a closed position wherein said flow of fluid through said respective first and second open-ended chambers is prevented, and said first and second spigots respectively engaging said first and second valve means to overcome said first and second spring means bias to respectively maintain said first and second valve means in the open position, whereby when said tap is disconnected from said mounting block, the sliding withdrawal of said first and second spigots respectively permits said first and second valve means to close to prevent the flow of fluid through said first and second open-ended chambers.

7. The assembly according to claim 6 wherein first and second adjustable valves means are mounted in said mounting block for respectively controlling the rate of flow of fluid through said first and second inlet passages, and means for adjusting said first and second adjustable valve means extend to an exterior face of said mounting block.

* * * * *